Oct. 12, 1948.  J. A. BACKSTROM  2,451,371
CUTTING TOOL HOLDING MEANS FOR MACHINE TOOLS
Filed July 28, 1943  3 Sheets-Sheet 1
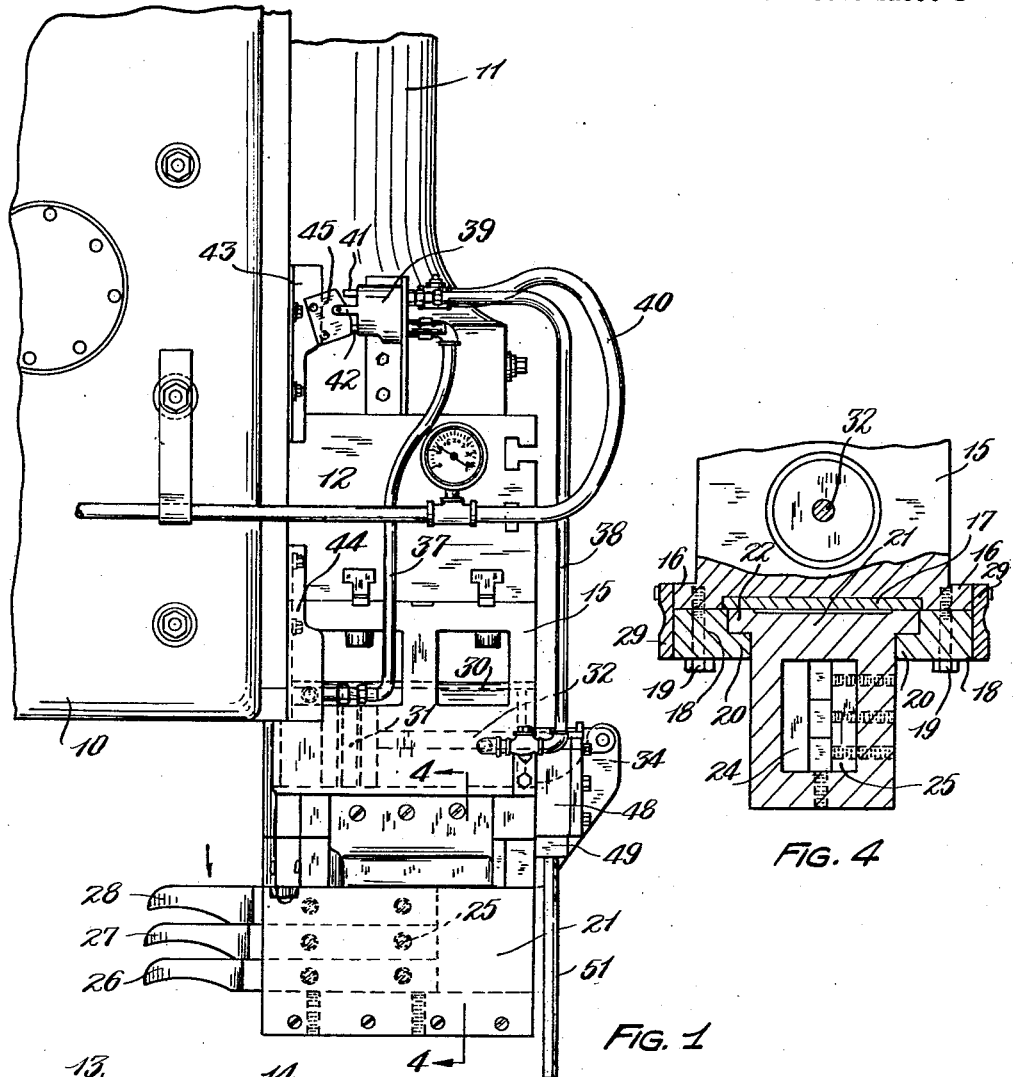
FIG. 4
FIG. 1
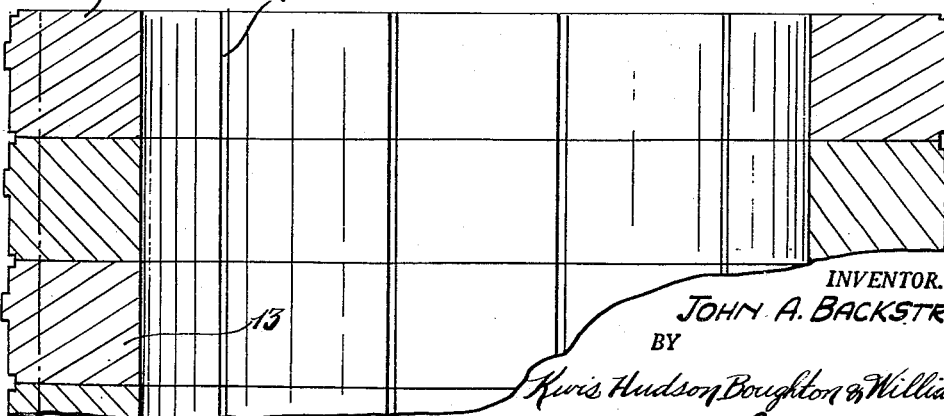
INVENTOR.
JOHN A. BACKSTROM
BY
Kwis Hudson Boughton & Williams
ATTORNEYS

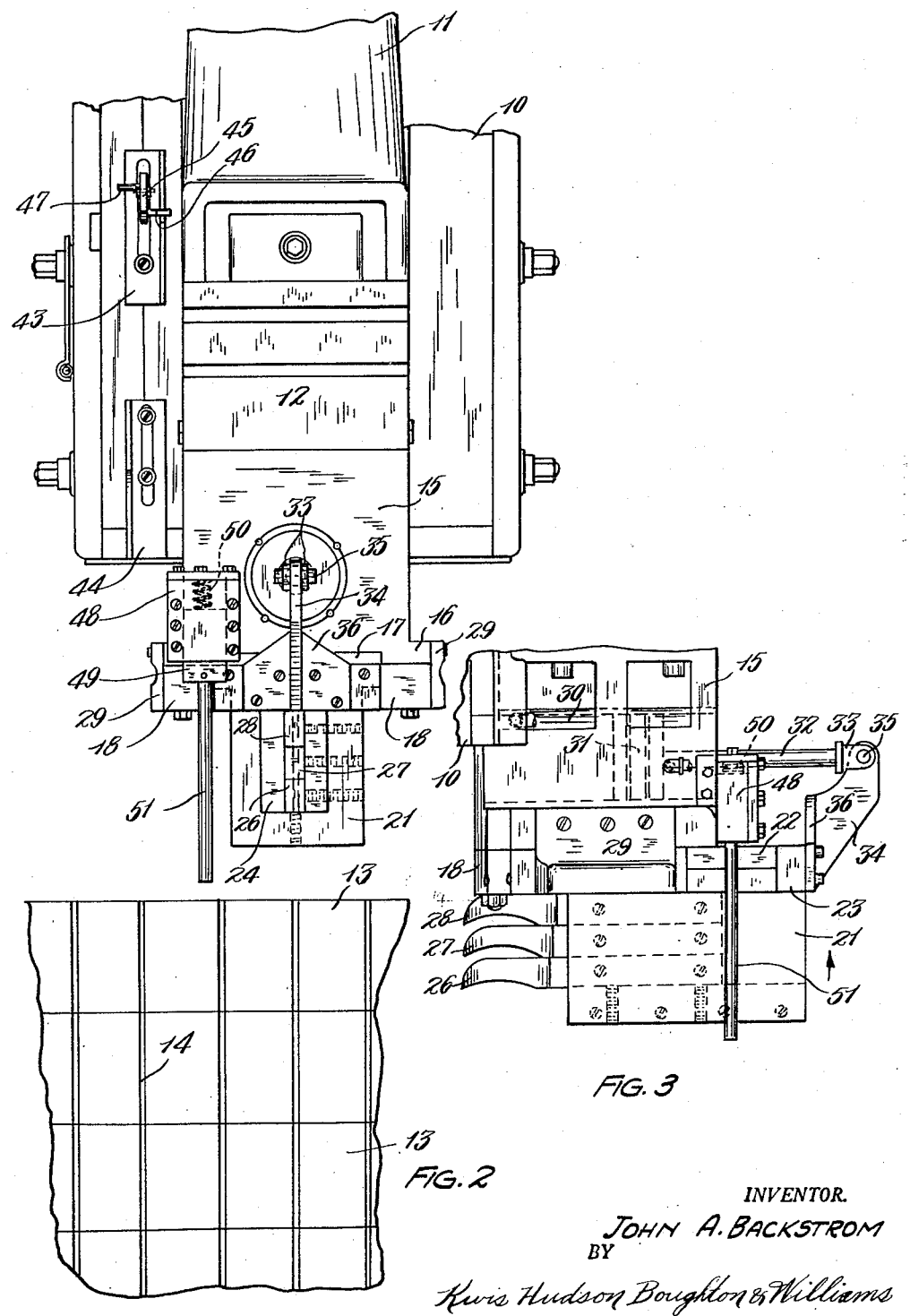

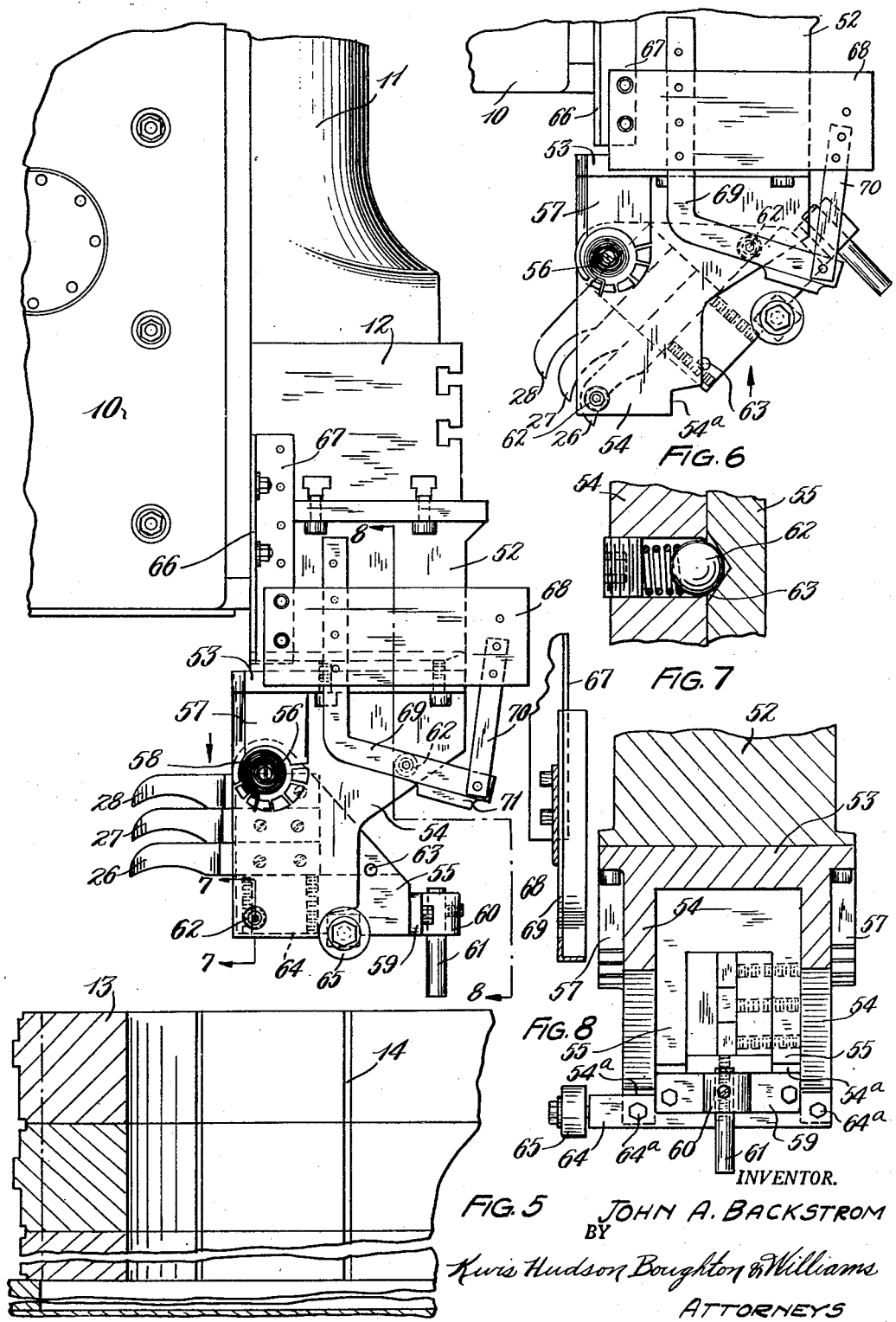

Patented Oct. 12, 1948

2,451,371

UNITED STATES PATENT OFFICE 2,451,371

CUTTING TOOLHOLDING MEANS FOR MACHINE TOOLS

John A. Backstrom, Euclid, Ohio, assignor to The Breck Company, a corporation of Ohio Application July 28, 1943, Serial No. 496,458

10 Claims. (Cl. 90—55)

This invention relates to an improved and novel cutting tool holding means for a slotter, planer or other similar type of machine tool wherein the cutting tool or tools ordinarily are moved relatively along, over or across and in contact with the work during their idle or rearward strokes.

An object of the invention is to provide a cutting tool holding means of the character above set forth and which means eliminates damage to and lessens the wear on the cutting tool or tools by automatically moving and maintaining the latter fully out of contact with the work during the idle or non-cutting strokes of the tool or tools relatively along, over or across the work.

Another object is to provide a cutting tool holding means of the character set forth and which means will increase the effective accurate life of the cutting tool or tools carried thereby and will improve the accuracy of the cuts taken in the work by the tool or tools.

A further object is to provide a cutting tool holding means of the kind specified and the use of which obviates repeated and frequent regrinding of the tool or tools thereby prolonging their useful life and increasing the efficiency of operation of the machine tool and conserving the time of the operator thereof.

Further and additional objects and advantages of the invention will become apparent hereinafter during the detailed description of embodiments of the invention and which description is to follow.

The invention contemplates a tool holding means for use in a slotter, planer or similar type of machine tool wherein the cutting tool or tools move relatively along, over or across and ordinarily in contact with the work during their idle or rearward strokes. The contemplated tool holding means is so constructed and so functions that the cutting tool or tools carried thereby are completely and automatically disengaged from the work at the start of and are so held during the idle or non-cutting strokes and then automatically moved to and held in an active or cutting position prior to and during their cutting strokes.

The tool holding means includes a movable element in which the tool or tools are secured and said element is moved automatically from an active or cutting position to one wherein the tool or tools are in a non-cutting or inactive position and vice versa. The movement of this element can be accomplished by various means as, for example, the element can be moved in both directions by power means such as a fluid pressure motor or any other suitable motor operated from any suitable power source. The movements of the element through the actuation of the motor are automatically controlled by suitable control means as, for example, a cam control mechanism. In addition, the element can be moved mechanically or its movement in one direction may be by positive means while its movement in the opposite direction can be by spring means or by gravity or by a combination thereof.

Referring to the accompanying drawings illustrating several embodiments of the invention, Fig. 1 is a fragmentary side elevational view of a portion of a vertical slotter to the reciprocating ram of which is secured one form of the improved and novel cutting tool holding means embodying the invention; the work which is clamped on the table of the machine tool being shown in section while the cutting tools are shown in cutting or active position and prior to their cutting engagement with the work.

Fig. 2 is a fragmentary front elevation of the slotter shown in Fig. 1 and is taken looking from the right hand side of said Fig. 1.

Fig. 3 is a fragmentary side elevational view of a portion of the slotter shown in Fig. 1 and illustrates the improved cutting tool holding means when the movable element thereof is in its rearward position and the cutting tools carried thereby are in non-cutting or inactive position.

Fig. 4 is a fragmentary transverse vertical sectional view taken substantially on line 4—4 of Fig. 1 looking in the direction of the arrows.

Fig. 5 is a view similar to Fig. 1 but illustrates a different form of the invention than that shown in Fig. 1.

Fig. 6 is a fragmentary side elevational view of a portion of the slotter shown in Fig. 5 and illustrates the relationship of the parts of the cutting tool holding means when the movable element thereof has been rocked to position the cutting tools in non-cutting or inactive position.

Fig. 7 is a fragmentary sectional view taken substantially on line 7—7 of Fig. 5 looking in the direction of the arrows, and Fig. 8 is a fragmentary transverse vertical sectional and front elevational view taken substantially on line 8—8 of Fig. 5, looking in the direction of the arrows.

As previously stated, the cutting tool holding means embodying the present invention can be advantageously used in various kinds of machine tools of the general type wherein the cutting tool or tools move relatively along, over or across and in contact with the work during their idle or rearward strokes as, for example, horizontal and vertical slotters, planers or other similar kinds of machine tools. Inasmuch as the cutting tool holding means of the present invention can be usefully applied to and employed in the operation of a vertical slotter, it has been illustrated herein and will be described as so applied.

As is well know in the art, vertical slotters comprise a bed having thereon a movable carriage equipped with an adjustable and/or indexible work supporting table. The carriage is given a feeding movement by suitable mechanism for the purpose of causing the cutting tools to cut slots in the work to the proper depth while the table is adjusted or is indexed on the carriage to bring successive portions of the work into position to be acted on by the cutting tools. At one end of the bed there is a vertical standard which on its face adjacent to the work supporting table is provided with a vertically movable or adjustable support and said support carries by means of suitable ways a vertically reciprocating ram that has provision at its lower end for attaching thereto the cutting tool or tools. The adjustment or movement of the support on the standard and the reciprocating movement of the ram are effected and controlled by suitable well known mechanism which acts to automatically reverse the movement of the ram at the predetermined limits of its cutting stroke and its idle or upward stroke. Inasmuch as the foregoing features of a vertical slotter are well known in the art and per se form no part of the present invention they have not been illustrated herein and will be well understood by anyone skilled in the art.

Referring to the accompanying drawings there is shown therein the movable or adjustable support 10 which is carried by the vertical standard (not shown) of a conventional vertical slotter. The reciprocating ram 11 of the slotter is slidably supported by the support 10 in any well known manner. The lower end of the ram has attached thereto the usual block 12 to which can be secured the cutting tool or tools. The cutting tool or tools ordinarily are carried by what is known as a "clapper box" and which box includes a tool carrying part that has a limited rocking movement such that upon the upward or idle stroke of the ram said part rocks slightly in one direction to relieve the cutting tools and which tools then drag along the work during said stroke, while upon the active or downward cutting stroke of the ram said part will rock slightly in the opposite direction to bring the tools to cutting position and the cutting action of the tools will hold said part in this rocked position during said cutting stroke.

The improved and novel cutting tool holding means of the present invention is intended to be used in place of the ordinary clapper box and in the manner later to be explained.

The work illustrated herein comprises rings 13 in which a plurality of circularly spaced internal slots 14 are to be cut. A plurality of the rings are stacked one above the other and clamped in this stacked position on the work supporting table of the machine and the clamped rings are so located that the cutting tool holding means on the lower end of the ram will move internally of the rings. The carriage which carries the work supporting table has feeding movement imparted thereto by well known mechanism to cause the rings to index toward the right as viewed in Figs. 1 and 5, in predetermined increments after each cutting stroke to cause the cutting tools to cut slots of the required depth as will be well understood. The rings and the work supporting table are indexed by well known mechanism upon the completion of one slot a distance equal to the circular spacing of the slots to cause the cutting tools to cut the successive internal slots in the rings. It will be understood that the cutting tools during each cutting stroke operate upon all of the vertically stacked rings. Referring to Figs. 1 to 4 inclusive the form of the invention shown therein will now be described.

A block 15 is secured to the underside of the block 12 which, in turn, is secured to the lower end of the ram 11 and said block 15 moves with the block 12 and the ram 11 during their reciprocatory movement. The block 15 at its lower end and on opposite sides thereof is provided with laterally extending flanges 16. The lower face of the block 15 is provided with a recess extending its full length and secured in said recess is a wear plate 17. Gibs 18 are secured to the underside of the block 15 and the flanges 16 by suitable securing means such as the screws 19. The inner edges of these gibs are stepped to provide parallel supporting ways 20 extending the full length of the gibs.

A tool carrying member 21 is slidably supported and guided by the gibs 18 and said member has at its upper end and on the opposite sides thereof longitudinally extending laterally projecting ribs 22 which bear upon and are supported by the ways 20 of the gibs. The top of the member 21 is recessed and engages adjacent its opposite longitudinal sides with the wear plate 17. It will be seen that the tool carrying member 21 is firmly supported and guided for sliding movement inwardly and outwardly along the bottom face of the block 15. The outer or right hand end of the member 21 at its upper corners has block portions 23 located at the outer ends of the ribs 22 and which block portions contact the right hand ends of the gibs 18 and limit the movement of the member 21 toward the left relative to the block 15 by their engagement with the right hand ends of the gibs 18, as viewed in the drawings. The tool carrying member 21 is provided with a centrally disposed longitudinally extending opening therethrough and in which opening the shanks of one or more cutting tools can be secured and clamped by means of suitable clamp screws 25 as will be well understood in the art.

In the present illustration the cutting tools are shown as three in number and comprise a roughing cutter 26, a semi-finishing cutter 27 and a finishing cutter 28 arranged one above the other in the inverse order named. Plates 29 are secured to the outer sides of the flanges 16 by suitable securing means and extend downwardly and over the outer sides of the gibs 18.

The block 15 is cored out and has fixed therein a cylinder 30 extending parallel to the ways 20 and provided with a piston 31 from which extends a piston rod 32 that projects outwardly and centrally of the right hand end of the block 15. The outer end of the piston rod has fixed thereto a fork 33 which straddles the upper end of an upwardly projecting arm 34 and is connected to said end of said arm by means of a pin 35. The arm 34 extends downwardly from its upper end and then angularly toward the left as viewed in the drawing, and merges into a plate 36 which is secured to the member 21 and the blocks 23. It will thus be seen that movement of the piston 31 in the cylinder 30 is transmitted through the piston rod 32, arm 34 and plate 36 to the member 21 to slide the latter in opposite directions on the lower end of the block 15.

The piston 31 is moved in opposite directions by means of fluid pressure introduced into the cylinder 30 and which in this instance is compressed air although it will be understood that hydraulic pressure could be utilized for the same purpose.

Conduits 37 and 38 are connected to the interior of the cylinder 30 at the opposite ends thereof and said conduits extend to a valve mechanism 39 carried by the ram 11. This valve mechanism may be of any well known and suitable form and includes means for selectively connecting one or the other of the conduits 37 and 38 with a supply conduit 40 which is connected to the valve mechanism and extends to a source of supply of compressed air. The valve mechanism 39 is actuated by a pair of normally extended plungers 41 and 42 and which plungers are selectively actuated to connect their respective conduits 37 or 38 with the supply conduit 40 and to effect a venting to atmosphere of the other conduit which is not connected to the supply conduit. Thus it will be seen that by depressing one of the plungers and allowing the normal extension of the other plunger, pneumatic pressure can be introduced into the cylinder 30 on one side or the other of the piston 31 while the interior of the cylinder 30 on the opposite side of the piston will be vented to atmosphere. Consequently the piston 31 can be pneumatically moved in the cylinder 30 to either one of its two extreme positions therein and such movement will effect a movement of the member 21 and the tools carried thereby either from the position shown in Fig. 1 to its position as shown in Fig. 3 or vice versa as the case may be.

Cam plates 43 and 44 are secured to the support 10 on the front thereof and adjacent to the ram 11. The cam plates 43 and 44 are vertically spaced with respect to each other and are provided with elongated slots through which their securing bolts extend, thus enabling the plates to be adjusted vertically of the support. The positions of these cam plates determine the points in the upward and downward travel of the ram 11 at which the member 21 is moved by the piston 31 into active or cutting position or into inactive or non-cutting position. The upper plate 43 will be so located that the member 21 and the tools carried thereby will be automatically moved to active or cutting position, as shown in Fig. 1 after the ram has moved sufficiently far upwardly to clear the work and before it commences its downward or cutting stroke. The plate 44 will be so positioned as to effect rearward movement of the member 21 and the tools carried thereby from the position shown in Fig. 1 to the position shown in Fig. 3 at the moment the downward or cutting stroke of the ram has been completed.

It will be noted that the cam plates 43 and 44 are angle plates with the arms thereof that have the cam surfaces formed thereon oppositely disposed with respect to each other. In other words, the arm of the cam plate 43 which has the cam surface thereon is located adjacent to the ram 11, while the corresponding arm of the cam plate 44 is located at the outer side of its attaching arm as clearly shown in Fig. 2.

The valve mechanism 39 has pivotally connected thereto a rocker plate 45 and said rocker plate is provided adjacent its lower left hand corner, as viewed in the drawings, with a pin 46 projecting laterally from the plate and toward the ram 11 and in a position to contact the cam surface of the cam plate 43 when the ram 11 approaches the limit of its upward movement as illustrated in Figs. 1 and 2. The rocker plate 45 adjacent its upper left hand corner as viewed in Figs. 1 and 2 is provided with a pin 47 projecting laterally from the side of the plate remote from the ram 11 and in a position to be acted on by the cam surface of the cam plate 44 when the downward or cutting stroke of the ram 11 is completed. When the pin 46 of the rocker plate 45 engages the cam surface of the cam plate 43 said rocker plate is rocked in an anti-clockwise direction and its inner edge contacts the plunger 42 of the valve mechanism 39 and depresses the same, and at this time the plunger 41 of said valve mechanism is fully extended. When the pin 47 of the rocker plate 45 contacts the cam surface of the cam plate 44 said rocker plate is rocked in a clockwise direction and its outer edge depresses the plunger 41 of the valve mechanism and at such time the plunger 42 thereof is fully extended.

In order to eliminate any outward sliding movement of the member 21 during the cutting stroke of the ram and under the thrust on the cutting tools carried by said member means is provided for positively holding the member 21 in its inner or cutting position. This means is in the form of a rectangular casing 48 secured to the block 15 and having a rectangular lock bolt 49 slidable vertically therein and of such length that when said lock bolt is fully projected a portion of the lock bolt will extend below the casing 48 and lie in the path of movement of a portion of the plate 36 and thus positively prevent outward movement of the plate 36 and the member 21. The lock bolt 49 is maintained in its fully projected or downward position, as shown in Figs. 1 and 2, by a coil spring 50 located in the casing 48 between the upper end of the lock bolt and the inner side of the upper wall of the casing, it being understood that suitable means is provided to keep the bolt from being completely expelled from the casing. A rod 51 extends downwardly from the lower end of the lock bolt 49 and is of such length that its lower end is located below the lower end of the member 21. Just prior to the ram completing its downward or cutting stroke the lower end of the rod 51 contacts the work supporting table and the further downward movement of the ram 11 to complete its cutting stroke causes the rod 51 and the lock bolt 49 to be moved positively upwardly against the action of the spring 50 and until the lock bolt 49 is completely housed within the casing 48 and is out of the path of movement of any part of the plate 36 and then the member 21 is free to be moved by the pneumatic motor from its cutting position as shown in Fig. 1 rearwardly to its inactive or non-cutting position as shown in Fig. 3.

In this connection it will be noted that the rod 51 is positioned at all times out of the path of movement of any portion of the plate 36. As soon as the member 21 commences its outer movement toward inactive position the upper end of the member will underlie the lower end of the casing 48 and hold the lock bolt 49 in its raised position. As soon as the ram 11 has reached its upward limit of movement and is ready to commence its downward or cutting stroke and the member 21 has been moved inwardly to cutting position the upper end of said member is free of the lock bolt 49 and the latter is free to be projected downwardly by the spring 50 and to have its lower portion located in the path of movement of the lower left hand part of the plate 36.

A résumé of the operation of the cutting tool holding means which has just been described will now be set forth. Assuming that the parts are in the position shown in Fig. 1 and the ram 11 is ready to commence its downward or cutting stroke, it will be noted that the rocker plate 45 has been rocked and the plunger 41 of the valve mechanism is fully extended and the plunger 42 thereof depressed, wherefore pneumatic pressure is being admitted to the cylinder 30 to the right of the piston and is being vented from said cylinder at the left side of the piston 31 and said piston has been moved inwardly of the cylinder to slide the member 21 inwardly to its cutting or active position. At this time the lock bolt 49 is projected and the member 21 is positively held thereby against outward movement. The ram 11 descends in its cutting stroke and the cutting tools 26, 27 and 28 start cutting a slot 14 in the inner periphery of the rings 13, it being understood that the work table with the rings thereon has been suitably indexed to position the rings for the cutting of such slot 14. As soon as the ram 11 has moved downwardly sufficiently far to free the pin 46 from the cam surface of the cam plate 43, the rocker plate 45 is partially rocked by the outward movement of the plunger 42 but not sufficiently far to admit pneumatic pressure to the left hand end of the cylinder 30. The ram continues its downward or cutting stroke and the cutting tools carried by the member 21 cut the groove 14 for a portion of its total depth. Near the end of the downward stroke of the ram the rod 51 contacts the work supporting table and is pushed upwardly to move the bolt 49 into the casing 48 and free the member 21 for rearward movement to inactive position. Simultaneously with the completion of the cutting stroke the pin 47 of the rocker plate 45 has been rocked by the cam surface of the cam plate 44 in a clockwise direction to depress the pin 41 and allow the pin 42 of the switch mechanism 39 to come out to fully extended position, whereupon pneumatic pressure is admitted to the cylinder 30 to the left of the piston 31 and vented from the cylinder at the right of said piston and the piston is moved by said pneumatic pressure toward the right end of the cylinder with a resultant right hand movement being imparted to the member 21 and consequently a movement of the cutting tools to a position wherein they do not contact the inner periphery of the rings 13.

The vertical slotter is provided, as previously explained, with mechanism for reversing the direction of movement of the ram 11 after it is moved predetermined distances in opposite directions and therefore as soon as the cutting stroke of the tools is completed the ram commences its upward or idle movement with the member 21 and the cutting tools carried thereby in the inactive position shown in Fig. 3. During this upward movement the pin 47 of the rocker plate 45 will move out of engagement with the cam surface of the cam plate 44 and the plunger 41 will be extended as is also the plunger 42 and the supply of pressure fluid to the cylinder 30 is terminated. The member 21, however, will remain in its rearward or non-cutting position during the upward stroke of the ram 11 and it will be seen that the tools carried by the member 21 are completely free of the work and therefore will not be injured or worn by scraping across the work nor will the latter be damaged by the upward movement of the tools. During the upward movement of the ram the carriage on which the work supporting table is mounted is given a feeding movement so that the cutting tools on their next cutting stroke will take a deeper cut in forming the slot 14.

After the ram 11 has moved upwardly and the member 21 is elevated above the work the pin 46 of the rocker plate 45 engages the cam surface of the cam plate 43 and rocks said rocker plate in an anti-clockwise direction to depress the plunger 42 of the valve mechanism and to admit pressure fluid into the cylinder 30 at the right of the piston 31 and cause the latter to move toward the left in the cylinder until the member 21 and cutting tools carried thereby are again in cutting or active position as shown in Fig. 1.

In this connection it will be recalled that during the left hand movement of the member 21 the lower end of the lock bolt 49 will ride on top of said member until the member has reached its most left hand position, at which time the lock bolt will be projected downwardly by its spring 50 and will lie in the path of movement toward the right of the plate 36 and positively hold the member 21 against right hand movement. The upward movement of the ram 11 is automatically terminated and its downward or cutting stroke initiated by mechanism well known in the art and again the cutting tools carried by the member 21 will make a cutting pass through the work.

The sequence of operations just described will be continued until the slot 14 has been cut to full depth, after which the ram will momentarily be held in its upward position and the work table properly indexed to position the rings 13 for the cutting of another slot 14 while the carriage will be moved rearwardly to commence its forward or feeding movement.

The form of the invention just described discloses one way in which the cutting tool holding means may be power operated to and from cutting or non-cutting position. In this connection it will be understood that various other forms of power motors can be employed in place of the pneumatic motor shown herein.

In Figs. 5 to 8 inclusive a different form of the invention is illustrated and one wherein the tool carrying member is positively moved to inactive position and is moved to active position by a combination of positive means, spring means and gravity. In this second form of the invention the parts which are identical with the corresponding parts in the first form have been given the same reference characters and need not be specifically described.

A block 52 is secured to the underside of the block 12 at the lower end of the ram 11 and said block 52 has secured to its underside a plate 53 from which depend parallel spaced legs 54, the lower right hand corners of which are provided with recesses 54a. The tool carrying member of this form of the invention consists of a pair of parallel substantially triangularly shaped arms 55 interconnected at their upper ends and which are pivotally connected to the legs 54 by means of a horizontal shaft 56 which passes through the legs 54 and through each arm 55 adjacent the apex thereof. The legs 54 at their upper left hand corners and at the location where the shaft 56 passes therethrough are provided with bosses 57 which have recesses therein adjacent their lower ends and surrounding the shaft 56 and which recesses house rat trap springs 58. The bosses 57 are provided adjacent the recesses with a plurality of spaced slots in any one of which one end of the springs 58 can be anchored while the other end of said springs can be secured to the shaft 56. The tension of the springs 58 can be adjusted by anchoring the outer end thereof in different ones of said slots and said springs act to rock the shaft 56 and the arms 55 of the tool carrying member in a clockwise direction toward active or cutting position. The arms 55 of the tool carrying member are interconnected by a bar 59 to which is secured a socket member 60 which carries a depending rod 61 that can be vertically adjusted and clamped in the socket and for a purpose later to be explained.

The legs 54 are provided with spaced apart spring points 62 that engage spaced apart recesses 63 formed in the arms 55 to hold the tool carrying member in either its active or cutting position as shown in Fig. 5, or in its inactive or non-cutting position as shown in Fig. 6. The tool carrying member may have the cutting tools 26, 27 and 28 secured therein as will be well understood in the art by means of suitable clamping screws which need not be explained herein.

The arms 55 of the tool carrying member have a rectangular bar 64 extending between and secured to their lower edges and projecting laterally therefrom and said bar carries at one of its outer ends a roller 65. When the tool carrying member is in cutting or active position the bar 64 has its projecting ends located in the recesses 54a of the legs 54. Each end of the bar carries adjustable screws 64a that engage the legs 54 and limit the downward movement of the tool carrying member.

The support 10 of the vertical slotter has one arm 66 of an angle bar vertically adjustably secured thereto by means of securing bolts which pass through elongated slots formed in said arm. This angle bar extends vertically and its outwardly projecting arm 67 has secured thereto near its lower end a plate 68 which extends parallel to the legs 54. An L-shaped angle bar member 69 has its vertical portion adjustably secured to the plate 68 while its lower free end is attached to the lower end of a bracing strap 70, the upper end of which is connected to the plate 68. The under edge of the bar 69 at the lower free end thereof is provided with a projecting portion 71 that cooperates under certain conditions later to be explained with the roller 65.

In Fig. 5 the parts are illustrated in the relationship they have during the downward or cutting stroke of the ram 11 and at which time the tool carrying member is in its downward or cutting position and is held therein by the lower spring points 62 of the legs 54, and also by the action of the springs 58 as well as by the cutting thrust on the cutting tools. The parts are so arranged that near the end of the downward or cutting stroke of the ram 11 the rod 61 positively engages the work supporting table and the additional downward movement of the ram 11 causes the tool carrying member to rock with the shaft 56 in an anti-clockwise direction against the action of the springs 58 and the spring points 62. The tool carrying member is thus rocked from its active or cutting position to its inactive or non-cutting position wherein the upper spring points 62 engage in the upper recesses 63 of the arms 55 and hold the tool carrying member in its rocked or elevated position and against the action of the springs 58. As the ram moves upwardly during its idle stroke the tools are completely disengaged from the work as in the previously described form.

After the ram has moved upwardly sufficiently far to completely clear the legs 54 from the interior of the work the roller 65 engages the under edge of the portion 71 of the bar 69 and the continued upward movement of the ram causes positive pressure to be exerted on the tool carrying member to disengage the engaged spring points 62 and allow the springs 58 together with gravity to rock the tool carrying member in a clockwise direction until it is fully in active or cutting position, at which time the lower spring points 62 engage the lower recesses 63. At this time the extended ends of the bar 64 are in the recesses 54a and the adjustable screws 64a are contacting the legs 54.

In view of the description of the operation of the first described form of the invention it will be unnecessary herein to explain in detail the mode of operation of this modified form of the invention, it being understood that the engagement of the rod 61 with the work supporting table near the end of the downward stroke of the ram 11 effects the rocking movement of the tool carrying member from the position shown in Fig. 5 to the position shown in Fig. 6.

It will also be understood that during the upward or idle stroke of the ram 11 which brings the roller 65 into engagement with the portion 71 of the strap 69, such engagement causes pressure to be exerted on the tool carrying member to overcome the engagement of the upper spring points 62 and the upper recesses 63 and allows the springs 58 and gravity to rock the tool carrying member to active or cutting position.

From the foregoing description it will be clearly evident that in both forms of the invention the cutting tools are completely disengaged from the work prior to the commencement of the upward or idle strokes of the ram and, therefore, said tools and the work are not injured or worn as would likely be the case if the tools dragged over the work during the idle strokes of the ram. In both forms of the invention the tool carrying member is automatically moved from its cutting or active position into its non-cutting or inactive position or vice versa at the proper times near the end of the ram's movement in opposite directions. It will also have been noted that the points at which such movement of the tool carrying member occur can be varied since provision is made for adjusting the elements that bring about these movements of the tool carrying member.

The use of the novel and improved tool carrying means embodying the present invention increases the life of the cutting tools, eliminates frequent regrinding thereof and obviates likelihood of injuring the work. This increases the accuracy and efficiency of operation of the vertical slotter or other similar machine tool equipped with a tool carrying means embodying the present invention.

Although several embodiments of the invention have been illustrated and described herein it will be understood that various modifications and adaptations thereof may occur within the scope of the appended claims.

Having thus described my invention, I claim:

1. In a machine tool of the type having a support, a reciprocable ram slidable on said support and adapted to carry a cutting tool, a work table, and means for reciprocating said ram to move the cutting tool carried thereby relative to the work on said table with a cutting stroke in one direction and an idle stroke in the opposite direction;

holding means for the cutting tool comprising a tool carrying member supported by said ram to move relative thereto from an inactive position wherein the tool will be disengaged from the work during the idle stroke to an active position wherein the tool will engage the work with a cutting action during the cutting stroke, means for automatically moving said member to active position at the end of the idle stroke, separate means acting to hold said member in said active position during the cutting stroke, and means controlled by the movement of the ram and acting positively substantially at the end of the cutting stroke to release said separate means and free said member for movement from its active position to its inactive position.

2. In a machine tool of the type having a support, a reciprocable ram slidable on said support and adapted to carry a cutting tool, a work table, and means for reciprocating said ram to move the cutting tool carried thereby relative to the work on said table with a cutting stroke in one direction and an idle stroke in the opposite direction; holding means for the cutting tool comprising a tool carrying member supported by said ram to move relative thereto from an inactive position wherein the tool will be disengaged from the work during the idle stroke to an active position wherein the tool will engage the work with a cutting action during the cutting stroke, means for automatically moving said member to said active position at the end of the idle stroke, separate means acting to hold said member in said active position during the cutting stroke, and means carried by said ram and cooperating with said table substantially at the end of the cutting stroke to release said separate means and free said member for movement from its active position to its inactive position.

3. In a machine tool of the type having a support, a reciprocable ram slidable on said support and adapted to carry a cutting tool, a work table, and means for reciprocating said ram to move the cutting tool carried thereby relative to the work on said table with a cutting stroke in one direction and an idle stroke in the opposite direction; holding means for the cutting tool comprising a tool carrying member supported by said ram to move relative thereto from an inactive position wherein the tool will be disengaged from the work during the idle stroke to an active position wherein the tool will engage the work with a cutting action during the cutting stroke, power means for moving said member to said active position at the end of the idle stroke and to said inactive position at the end of the cutting stroke, locking means for positively locking said member in said active position during the cutting stroke, and means controlled by the movement of the ram and acting automatically substantially at the end of the cutting stroke for releasing said locking means to free said member for movement from its active position to its inactive position.

4. A machine tool as defined in claim 3 and wherein means is provided for holding said locking means in retracted position during the idle stroke.

5. In a machine tool of this type having a support, a reciprocable ram slidable on said support and adapted to carry a cutting tool, a work table, and means for reciprocating said ram to move the cutting tool carried thereby relative to the work on said table with a cutting stroke in one direction and an idle stroke in the opposite direction; holding means for the cutting tool comprising a tool carrying member supported by said ram to move relative thereto from an inactive position wherein the tool will be disengaged from the work during the idle stroke to an active position wherein the tool will engage the work with a cutting action during the cutting stroke, power means controlled by the movements of said ram for moving said member to said active position at the end of the idle stroke and to said inactive position at the end of the cutting stroke, a normally extended lock bolt adapted to positively hold said member against movement from said active position to said inactive position, and means controlled by the movement of the ram and acting substantially at the end of the cutting stroke to retract said normally extended lock bolt and free said member for movement from active position to inactive position.

6. A machine tool as defined in claim 5 and wherein the means controlled by the movement of the ram comprises an element carried by the ram and cooperating with the work table substantially at the end of the cutting stroke to positively retract said lock bolt and free said member for movement from active to inactive position, while said member is provided with a portion acting to hold said lock bolt retracted when said member is in inactive position.

7. In a machine tool of the type having a support, a reciprocable ram slidable on said support and adapted to carry a cutting tool, a work table, and means for reciprocating said ram to move the cutting tool carried thereby relative to the work on said table with a cutting stroke in one direction and an idle stroke in the opposite direction; holding means for the cutting tool comprising a tool carrying member pivotally supported by said ram to swing relative thereto from an inactive position wherein the tool will be disengaged from the work during the idle stroke to an active position wherein the tool will engage the work with a cutting action during the cutting stroke, means for causing said member to automatically swing to said active position at the end of the idle stroke, separate means acting to hold said member in said active position during the cutting stroke, and means controlled by the movement of the ram and acting positively substantially at the end of the cutting stroke to release said separate means and free said member for swinging movement from its active position to its inactive position.

8. A machine tool as defined in claim 7 and wherein said member is provided with an element cooperating with said table substantially at the end of the cutting stroke to release said separate means and positively swing said member from active to inactive position.

9. In a machine tool of the type having a support, a reciprocable ram slidable on said support and adapted to carry a cutting tool, a work table, and means for reciprocating said ram to move the cutting tool carried thereby relative to the work on said table with a cutting stroke in one direction and an idle stroke in the opposite direction; holding means for the cutting tool comprising a tool carrying member pivotally supported by said ram to swing relative thereto from an inactive position wherein the tool will be disengaged from the work during the idle stroke to an active position wherein the tool will engage the work with a cutting action during the cutting stroke, means for urging said member toward said active position, separate means acting to hold said member in said active position during the cutting stroke, means controlled by the movement of the ram and acting positively substantially at the end of the cutting stroke to release said separate means and move said member from active to inactive position, a second separate means acting to hold said member in said inactive position during the idle stroke, and means controlled by the movement of the ram and acting positively substantially at the end of the idle stroke to release said second separate means and free said member for movement from inactive position to active position.

10. A machine tool as defined in claim 9 and wherein the means which acts to release the first mentioned separate means and to move said member from active to inactive position includes an element carried by said member and cooperating with the work table substantially at the end of the cutting stroke while the means which acts to release said second separate means at the end of the idle stroke includes cooperating elements carried by said member and by said support.

JOHN A. BACKSTROM.

REFERENCES CITED

The following references are of record in the file of this patent:

UNITED STATES PATENTS

| Number | Name | Date |
| --- | --- | --- |
| 409,451 | Caldwell | Aug. 20, 1889 |
| 579,976 | Gordon | Apr. 6, 1897 |
| 581,458 | Goddu | Apr. 27, 1897 |
| 828,425 | Ruedy | Aug. 14, 1906 |
| 1,466,062 | Rhodes | Aug. 28, 1923 |
| 1,688,177 | Croft | Oct. 16, 1928 |
| 1,806,696 | Mesker | May 26, 1931 |
| 2,090,508 | Zimmermann et al. | Aug. 17, 1937 |

FOREIGN PATENTS

| Number | Country | Date |
| --- | --- | --- |
| 88,103 | Germany | Jan. 25, 1886 |
| 173,852 | Great Britain | Jan. 5, 1922 |
| 330,202 | Great Britain | June 5, 1930 |